(12) United States Patent
Ueda

(10) Patent No.: US 8,587,296 B2
(45) Date of Patent: Nov. 19, 2013

(54) ROTATION ANGLE DETECTING DEVICE

(75) Inventor: Takeshi Ueda, Kashiba (JP)

(73) Assignee: JTEKT Corporation, Osaka (JP)

( * ) Notice: Subject to any disclaimer, the term of this patent is extended or adjusted under 35 U.S.C. 154(b) by 202 days.

(21) Appl. No.: 13/336,206

(22) Filed: Dec. 23, 2011

(65) Prior Publication Data

US 2012/0182009 A1     Jul. 19, 2012

(30) Foreign Application Priority Data

Jan. 17, 2011     (JP) .................................. 2011-006917

(51) Int. Cl.
*G01B 7/30*     (2006.01)

(52) U.S. Cl.
USPC ..................................... 324/207.25

(58) Field of Classification Search
USPC ..................... 324/207.25, 207.11–207.14
See application file for complete search history.

(56) References Cited

U.S. PATENT DOCUMENTS

| | | | |
|---|---|---|---|
| 6,930,423 B2 * | 8/2005 | Kitazawa ...................... 310/168 |
| 7,009,389 B2 * | 3/2006 | Nakano et al. ........... 324/207.25 |
| 2002/0111763 A1 | 8/2002 | Koga |
| 2007/0132423 A1 | 6/2007 | Ajima et al. |
| 2009/0230824 A1 | 9/2009 | Hornberger et al. |
| 2010/0045219 A1 | 2/2010 | Ajima et al. |

FOREIGN PATENT DOCUMENTS

| | | |
|---|---|---|
| EP | 1 796 257 A1 | 6/2007 |
| JP | A-2002-213944 | 7/2002 |
| JP | A-2003-241411 | 8/2003 |
| WO | WO 2007/062766 A1 | 6/2007 |

OTHER PUBLICATIONS

May 30, 2012 Extended Search Report issued in European Patent Application No. 12150150.6.

* cited by examiner

*Primary Examiner* — Tung X Nguyen
(74) *Attorney, Agent, or Firm* — Oliff & Berridge, PLC

(57) ABSTRACT

Three magnetic sensors are arranged around a rotor at predetermined angular intervals about the rotation axis of the rotor. Sinusoidal signals having a phase difference of 120° are output from the magnetic sensors. A rotation angle computing device detects a magnetic pole transition in a first output signal as follows. The rotation angle computing device detects a magnetic pole transition in the first output signal based on a current value of one of the second and third sinusoidal signals, an absolute value of a difference between an immediately preceding value and the current value of the one of the second and third sinusoidal signals being larger than an absolute value of a difference between an immediately preceding value and the current value of the other of the second and third sinusoidal signals, an immediately preceding value of the first sinusoidal signal and a current value of the first sinusoidal signal.

2 Claims, 9 Drawing Sheets

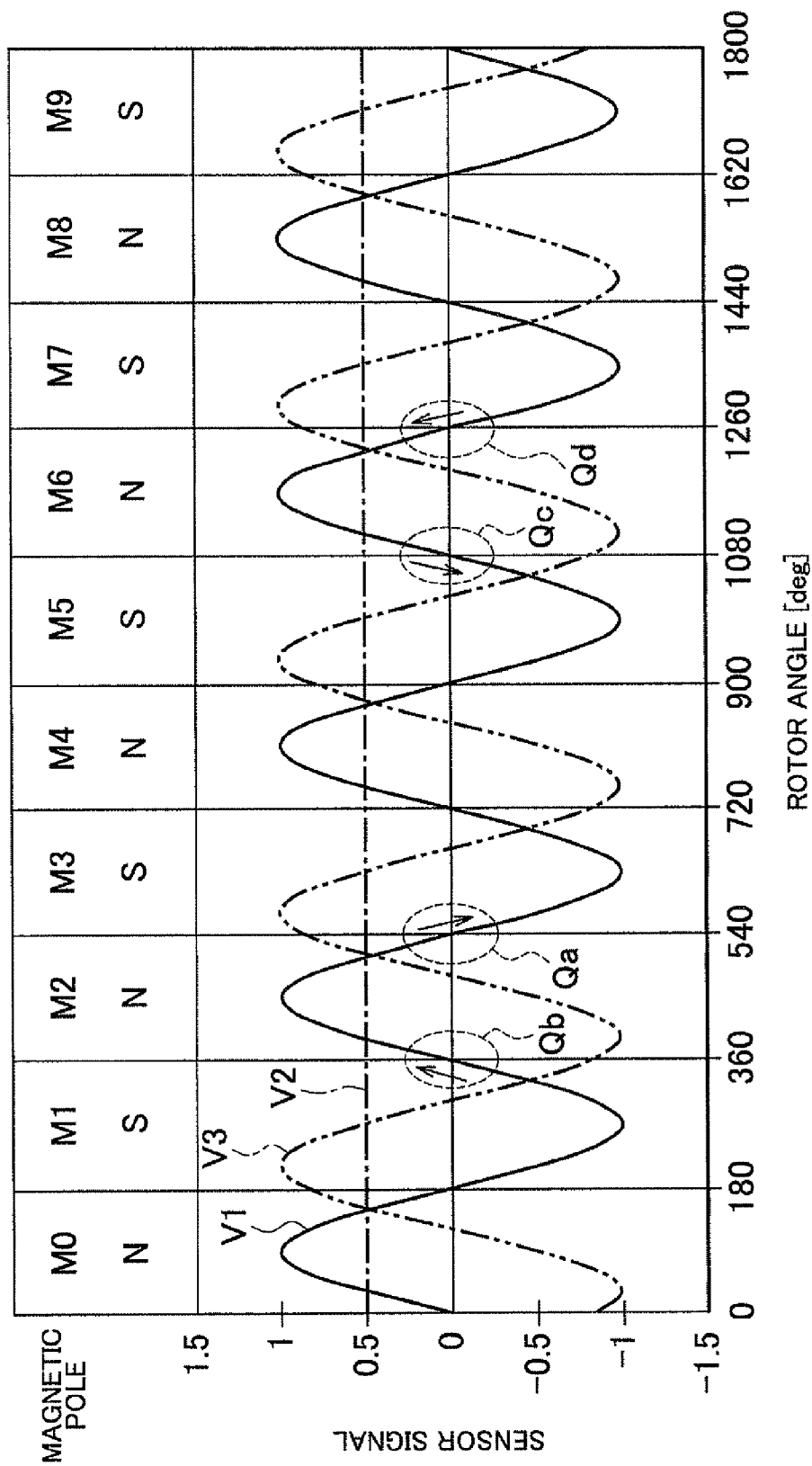

ROTATION ANGLE DETECTING DEVICE

INCORPORATION BY REFERENCE

The disclosure of Japanese Patent Application No. 2011-006917 filed on Jan. 17, 2011 including the specification, drawings and abstract, is incorporated herein by reference in its entirety.

BACKGROUND OF THE INVENTION

1. Field of the Invention

The invention relates to a rotation angle detecting device that detects the rotation angle of a rotor, for example, a rotor of a brushless motor.

2. Description of Related Art

In order to control a brushless motor used in an electric power steering system, or the like, currents need to be passed through stator coils in accordance with the rotation angle of a rotor. Therefore, there is known a rotation angle detecting device that detects the rotation angle of the rotor of the brushless motor using a detection rotor that rotates in accordance with rotation of the brushless motor. Specifically, as shown in FIG. 8, a detection rotor 101 (hereinafter, referred to as "rotor 101") has a cylindrical magnet 102 with a plurality of magnetic pole pairs. The number of magnetic pole pairs of the cylindrical magnet 102 corresponds to the number of magnetic pole pairs of the rotor of the brushless motor. Two magnetic sensors 121 and 122 are arranged around the rotor 101 at a predetermined angular interval about the rotation axis of the rotor 101. The magnetic sensors 121 and 122 output respective sinusoidal signals that have a phase difference of a given degree. The rotation angle of the rotor 101 (the rotation angle of the rotor of the brushless motor) is detected on the basis of these two sinusoidal signals (for example, see Japanese Patent Application Publication No. 2003-241411 (JP-A-2003-241411) and Japanese Patent Application Publication No. 2002-213944 (JP-A-2002-213944)).

In this example, the magnet 102 has the five magnetic pole pairs (M0, M1), (M2, M3), (M4, M5), (M6, M7) and (M8, M9). That is, the magnet 102 has ten magnetic poles M0 to M9 that are arranged at equiangular intervals. The magnetic poles M0 to M9 are arranged at angular intervals of 36° (180° in electric angle) about the rotation axis of the rotor 101. In addition, the two magnetic sensors 121 and 122 are arranged at an angular interval of 18° (90° in electric angle) about the rotation axis of the rotor 101.

The direction indicated by the arrow in FIG. 8 is defined as the normal rotation direction of the detection rotor 101. Then, as the rotor 101 is rotated in the normal direction, the rotation angle of the rotor 101 increases, while, as the rotor 101 is rotated in the reverse direction, the rotation angle of the rotor 101 decreases. As shown in FIG. 9, the magnetic sensors 121 and 122 respectively output sinusoidal signals V1 and V2. Each of the sinusoidal signals V1 and V2 has a cycle, during which the rotor 101 rotates by an angle (72° (360° in electric angle)) corresponding to a single magnetic pole pair, as one cycle.

The angular range of one rotation of the rotor 101 is divided into five sections that correspond to the five magnetic pole pairs, and then the angle of the rotor 101, which is expressed on the condition that the start position of each section is 0° and the end position of each section is 360°, is termed the electric angle $\theta e$ of the rotor 101. In this case, the angular widths of the ten magnetic poles are equal to one another, so the electric angle $\theta e$ of the rotor 101 coincides with the electric angle of the rotor of the brushless motor. In this example, the first magnetic sensor 121 outputs an output signal V1 ($=A1 \cdot \sin \theta e$), and the second magnetic sensor 122 outputs an output signal V2 ($=A2 \cdot \cos \theta e$). A1 and A2 are amplitudes. If the amplitude A1 of the output signal V1 and the amplitude A2 of the output signal V2 are equal to each other, the electric angle $\theta e$ of the rotor 101 may be obtained using both output signals V1 and V2 according to Expression 1 shown below.

$$\theta e = \tan^{-1}(\sin \theta e / \cos \theta e) = \tan^{-1}(V1/V2) \qquad \text{Expression 1}$$

The electric angle $\theta e$ obtained in this way is used to control the brushless motor.

When a brushless motor used in an electric power steering system, or the like, is controlled, a steering angle or the angular velocity of a steering angle may be used to control the brushless motor. The steering angle and the angular velocity of the steering angle may be computed on the basis of the mechanical angle of the rotor of the brushless motor. In addition, the angular velocity of the steering angle may be computed on the basis of the mechanical angle (hereinafter, referred to as "relative mechanical angle") of the rotor with respect to the initial position of the rotor at the time of the start of rotation angle computing process.

When the mechanical angle or relative mechanical angle of the rotor is detected, it is necessary to detect a magnetic pole transition in the output signal of a magnetic sensor. Here, detecting a magnetic pole transition in the output signal of the magnetic sensor is detecting a transition in magnetic pole sensed by the magnetic sensor and the direction of the transition in magnetic pole. A magnetic pole transition in the output signal of the magnetic sensor may be detected, for example, on the basis of the output signals V1 and V2 of the two respective magnetic sensors 121 and 122 shown in FIG. 8.

If the amplitudes A1 and A2 of the output signals V1 and V2 of the two respective magnetic sensors 121 and 122 are regarded as being equal to a value A or both signals V1 and V2 are normalized such that both amplitudes become a predetermined prescribed value A, one output signal V1 is expressed by $V1=A \cdot \sin \theta e$, and the other output signal V2 is expressed by $V2=A \cdot \cos \theta e$. Furthermore, if A=1, one output signal V1 is expressed by $V1=\sin \theta e$, and the other output signal V2 is expressed by $V2=\cos \theta e$. Then, for the sake of easy description, the output signals V1 and V2 of the magnetic sensors 121 and 122 are expressed by $V1=\sin \theta e$ and $V2=\sin(\theta+90°)=\cos \theta e$, respectively.

FIG. 9 shows the output signals V1 and V2 of the magnetic sensors 121 and 122 with respect to a rotor angle (mechanical angle) in the case where the rotation angle of the rotor 101 is set at 0° when the boundary between the magnetic pole M9 and magnetic pole M0 of the rotor 101 faces the first magnetic sensor 121. However, the rotor angle is expressed by an angle that is obtained by multiplying an actual mechanical angle by the number of magnetic pole pairs ("5" in this example) of the rotor 101. In addition, in FIG. 9, the magnetic poles M0 to M9 each indicate the magnetic pole that is sensed by the first magnetic sensor 121.

A transition in magnetic pole sensed by the first magnetic sensor 121 is classified into the following four cases.

a) The magnetic pole sensed by the first magnetic sensor 121 changes from the north pole to the south pole when the rotor 101 is rotating in the normal direction. For example, as indicated by the arrow in the ellipse indicated by the reference sign Qa in FIG. 9, the magnetic pole sensed by the first magnetic sensor 121 changes from M2 to M3.

b) The magnetic pole sensed by the first magnetic sensor 121 changes from the south pole to the north pole when the rotor

101 is rotating in the normal direction. For example, as indicated by the arrow in the ellipse indicated by the reference sign Qb in FIG. 9, the magnetic pole sensed by the first magnetic sensor 121 changes from M1 to M2.

c) The magnetic pole sensed by the first magnetic sensor 121 changes from the north pole to the south pole when the rotor 101 is rotating in the reverse direction. For example, as indicated by the arrow in the ellipse indicated by the reference sign Qc in FIG. 9, the magnetic pole sensed by the first magnetic sensor 121 changes from M6 to M5.

d) The magnetic pole sensed by the first magnetic sensor 121 changes from the south pole to the north pole when the rotor 101 is rotating in the reverse direction. For example, as indicated by the arrow in the ellipse indicated by the reference sign Qd in FIG. 9, the magnetic pole sensed by the first magnetic sensor 121 changes from M7 to M6.

The transition in magnetic pole in the above description a) (see Qa in FIG. 9) may be detected by determining whether the following first determination condition is satisfied.

First Determination Condition: "V2<0" and "immediately preceding value of V1>0" and "current value of V1≤0"

The transition in magnetic pole in the above description b) (see Qb in FIG. 9) may be detected by determining whether the following second determination condition is satisfied.

Second Determination Condition: "V2>0" and "immediately preceding value of V1<0" and "current value of V1>0"

The transition in magnetic pole in the above description c) (see Qc in FIG. 9) may be detected by determining whether the following third determination condition is satisfied.

Third Determination Condition: "V2>0" and "immediately preceding value of V1≥0" and "current value of V1<0"

The transition in magnetic pole in the above description d) (see Qd in FIG. 9) may be detected by determining whether the following fourth determination condition is satisfied.

Fourth Determination Condition: "V2<0" and "immediately preceding value of V1≤0" and "current value of V1>0"

That is, when it is determined that the first determination condition is satisfied, it is determined that the transition in magnetic pole in the above description a) has occurred. When it is determined that the second determination condition is satisfied, it is determined that the transition in magnetic pole in the above description b) has occurred. When it is determined that the third determination condition is satisfied, it is determined that the transition in magnetic pole in the above description c) has occurred. When it is determined that the fourth determination condition is satisfied, it is determined that the transition in magnetic pole in the above description d) has occurred.

If the magnetic sensor malfunctions, the value of the output signal may be fixed at a certain value. Such an abnormality in output signal is termed stuck abnormality. If a stuck abnormality occurs in the first output signal V1 or the second output signal V2, a transition in magnetic pole cannot be accurately detected. For example, if the value of the second output signal V2 is fixed at "0", none of the first to fourth determination conditions is satisfied. Therefore, a transition in magnetic pole in the above descriptions a) to d) cannot be detected.

In addition, also when the value of the second output signal V2 is fixed at a value other than "0", such as "0.5", a transition in magnetic pole is erroneously detected. FIG. 10 shows the output signals V1 and V2 of the magnetic sensors 121 and 122 when the value of the second output signal V2 is fixed at "0.5". In FIG. 10, in a transition in magnetic pole indicated by the arrow within the ellipse Qa, V2 should be smaller than 0 but V2 is actually larger than 0, so the first determination condition is not satisfied, and the third determination condition is satisfied. Therefore, the transition in magnetic pole in the above description a) is erroneously detected as the transition in magnetic pole in the above description c). Similarly, in FIG. 10, in a transition in magnetic pole indicated by the arrow in the ellipse Qd, V2 should be smaller than 0 but V2 is actually larger than 0, so the fourth determination condition is not satisfied, and the second determination condition is satisfied. Therefore, the transition in magnetic pole in the above description d) is erroneously detected as the transition in magnetic pole in the above description b).

SUMMARY OF THE INVENTION

It is an object of the invention to provide a rotation angle detecting device that is able to accurately detect a transition in magnetic pole even when a stuck abnormality occurs in one of a plurality of sinusoidal signals.

An aspect of the invention relates to a rotation angle detecting device that includes a detection rotor that rotates in accordance with rotation of a rotor and that has a plurality of magnetic poles, and a sensor that outputs three sinusoidal signals which have a phase difference of a predetermined degree in accordance with rotation of the detection rotor, the rotation angle detecting device detecting a rotation angle of the rotor based on the sinusoidal signals. The rotation angle detecting device includes: a signal reading unit that reads the sinusoidal signals in each predetermined computation cycle; and a detecting unit that detects a magnetic pole transition in at least one of the sinusoidal signals on the basis of the sinusoidal signals read by the signal reading unit. When the sinusoidal signal in which a magnetic pole transition is detected is a first sinusoidal signal, one of the other two sinusoidal signals is a second sinusoidal signal and the other one of the other two sinusoidal signals is a third sinusoidal signal, the detecting unit detects a magnetic pole transition in the first sinusoidal signal based on a current value of one of the second sinusoidal signal and the third sinusoidal signal, an absolute value of a difference between an immediately preceding value and the current value of the one of the second and third sinusoidal signals being larger than an absolute value of a difference between an immediately preceding value and the current value of the other of the second and third sinusoidal signals, an immediately preceding value of the first sinusoidal signal and a current value of the first sinusoidal signal.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a schematic view that shows the output signal waveforms in the case where the value of the second output signal is fixed at 0.5, and a magnetic pole sensed by the first magnetic sensor;

DETAILED DESCRIPTION OF EMBODIMENTS

Figure 1:
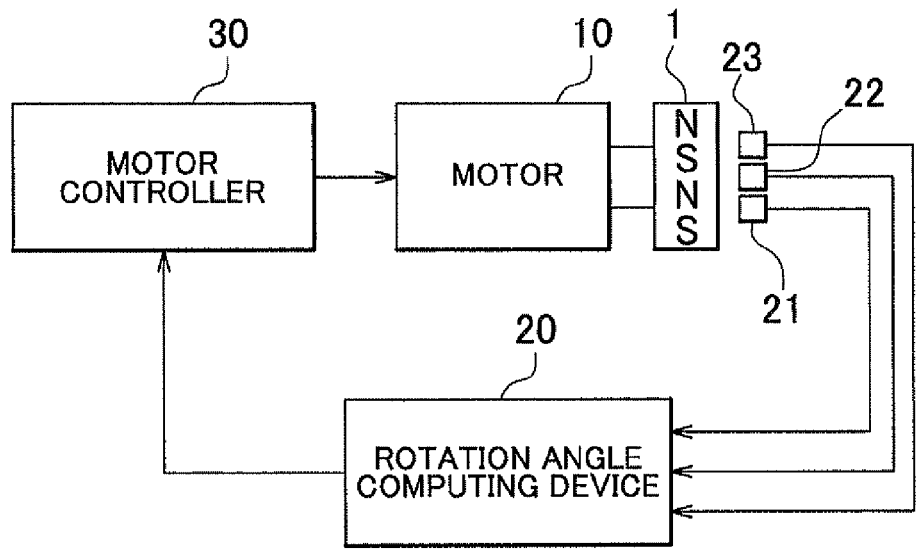
FIG. 1 is a schematic view that shows the configuration in the case where a rotation angle detecting device according to an embodiment of the invention is applied to a rotation angle detecting device that is used to detect the rotation angle of a rotor of a brushless motor.
Figure 2:
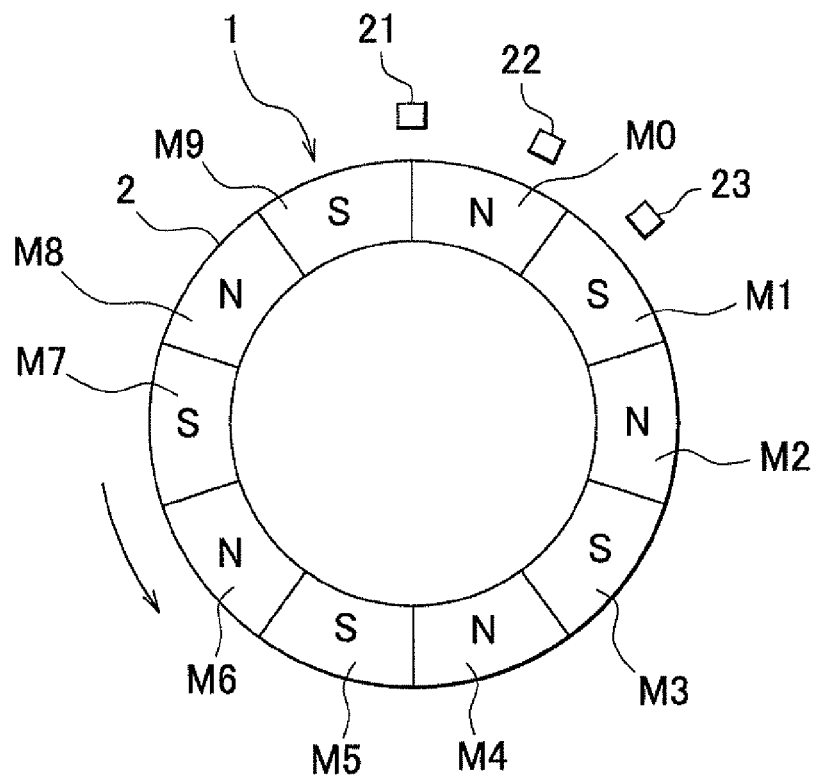
FIG. 2 is a schematic view that shows the configuration of a detection rotor.

Hereinafter, an embodiment in which the invention is applied to a rotation angle detecting device used to detect the rotation angle of a rotor of a brushless motor will be described in detail with reference to the accompanying drawings. FIG. 1 is a schematic view that shows the configuration in the case where a rotation angle detecting device according to the embodiment of the invention is applied to the rotation angle detecting device that is used to detect the rotation angle of the rotor of the brushless motor. The rotation angle detecting device includes a detection rotor (hereinafter, simply referred to as "rotor 1") that rotates with rotation of the brushless motor 10. As shown in FIG. 2, the rotor 1 includes a cylindrical magnet 2 with a plurality of magnetic pole pairs that correspond to magnetic pole pairs of the rotor of the brushless motor 10.

The magnet 2 has five magnetic pole pairs (M0, M1), (M2, M3), (M4, M5), (M6, M7) and (M8, M9). That is, the magnet 2 has ten magnetic poles M0 to M9 that are arranged at equiangular intervals. The magnetic poles M0 to M9 are arranged at angular intervals of 36° (180° in electric angle) about the rotation axis of the rotor 1. Three magnetic sensors 21, 22 and 23 are arranged around the rotor 1 at angular intervals of a predetermined angle (24° (120° in electric angle)) about the rotation axis of the rotor 1. These three magnetic sensors 21, 22 and 23 may be referred to as the first magnetic sensor 21, the second magnetic sensor 22 and the third magnetic sensor 23, respectively. Each magnetic sensor may include, for example, an element of which the electrical characteristic change under the influence of the magnetic field, such as a Hall element and a magnetoresistance element (MR element).

Figure 3:
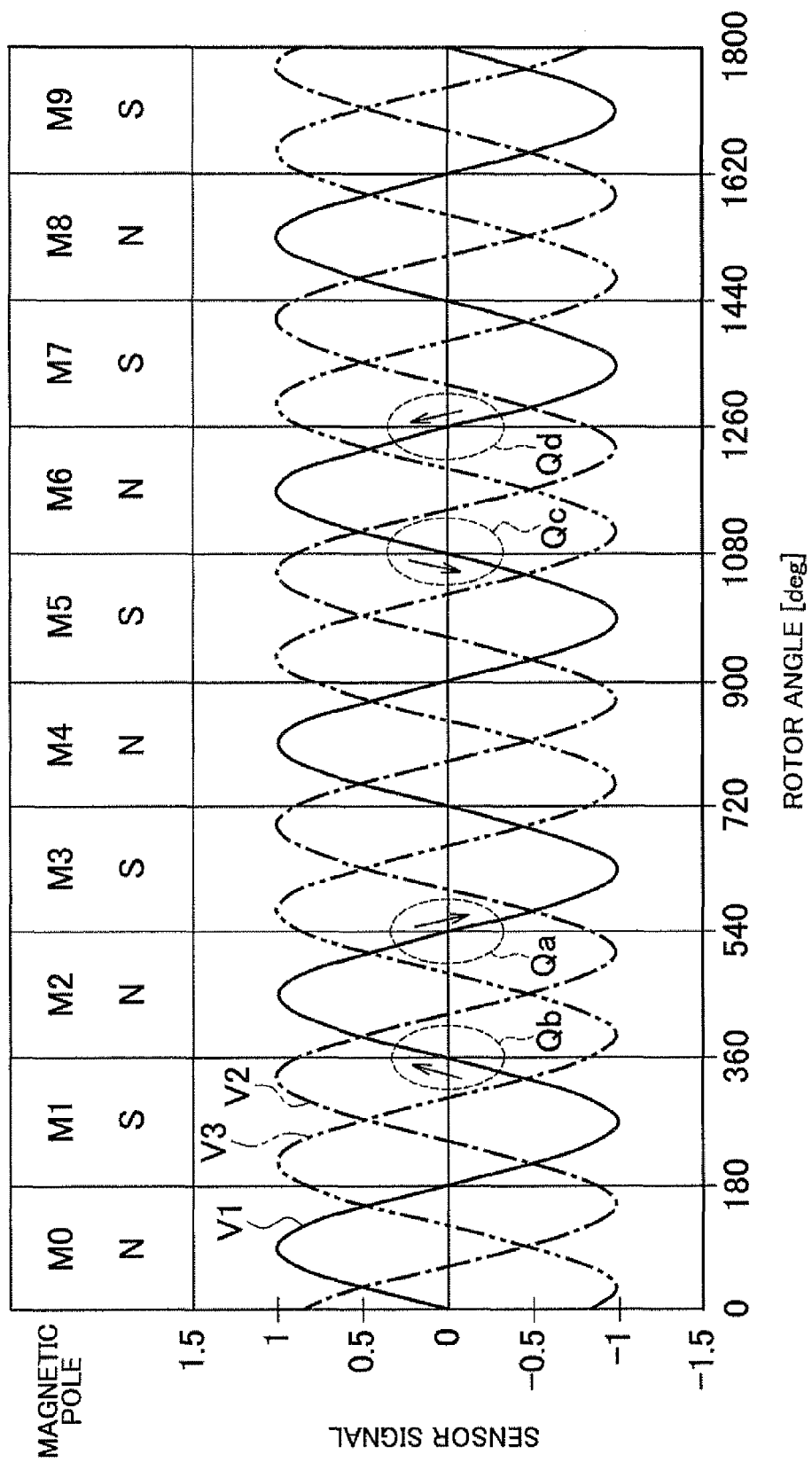
FIG. 3 is a schematic view that shows the output signal waveforms of first, second and third magnetic sensors and the magnetic pole sensed by the first magnetic sensor.

The direction indicated by the arrow in FIG. 2 is defined as the normal rotation direction of the rotor 1. As the rotor 1 is rotated in the normal direction, the rotation angle of the rotor 1 increases; whereas, as the rotor 1 rotates in the reverse direction, the rotation angle of the rotor 1 decreases. As shown in FIG. 3, the magnetic sensors 21, 22 and 23 respectively output sinusoidal signals V1, V2 and V3. Each of the sinusoidal signals V1, V2 and V3 has the cycle, during which the rotor 1 rotates by an angle (72° (360° in electric angle)) corresponding to a single magnetic pole pair, as one cycle.

FIG. 3 shows the output signals V1, V2 and V3 of the respective magnetic sensors 21, 22 and 23 with respect to a rotor angle (mechanical angle) in the case where the rotation angle of the rotor 1 is set at 0° when the boundary between the magnetic pole M9 and magnetic pole M0 of the rotor 1 faces the first magnetic sensor 21. The rotor angle (degrees) of the abscissa axis in FIG. 3 indicates an angle obtained by multiplying a mechanical angle by the number of magnetic pole pairs ("5" in this embodiment). In addition, FIG. 3 shows the magnetic poles M0 to M9 sensed by the first magnetic sensor 21 in accordance with a rotor angle.

The mechanical angle of the rotor 1 with respect to the initial position of the rotor 1 at the time of the start of rotation angle computing process is defined as a relative mechanical angle $\theta m$. Note that, in this embodiment, the relative mechanical angle $\theta m$ is expressed by a value obtained by multiplying the mechanical angle of the rotor 1 with respect to the initial position of the rotor 1 at the time of the start of rotation angle computing process, by the number of magnetic pole pairs of the rotor 1 ("5" in this example). The angular range of one rotation of the rotor 1 is divided into five sections that correspond to the five magnetic pole pairs, and then the angle of the rotor 1, which is expressed on the condition that the start position of each section is 0° and the end position of each section is 360°, is termed the electric angle $\theta e$ of the rotor 1. In this case, the angular widths of the ten magnetic poles are equal to one another, so the electric angle $\theta e$ of the rotor 1 coincides with the electric angle of the rotor of the brushless motor.

Here, the first magnetic sensor 21 outputs the output signal $V1(-A1 \cdot \sin \theta e)$ for each of the sections that correspond to the five magnetic pole pairs. In this case, the second magnetic sensor 22 outputs the output signal $V2 (=A2 \cdot \sin(\theta e+120°))$ for each of the sections that correspond to the five magnetic pole pairs. In addition, the third magnetic sensor 23 outputs the output signal $V3 (=) A3 \cdot \sin(\theta e+240°)=A3 \cdot \cos \theta))$ for each of the sections that correspond to the five magnetic pole pairs. A1, A2 and A3 respectively indicate amplitudes. That is, the magnetic sensors 21, 22 and 23 output respective sinusoidal signals that have a phase difference of 120° (electric angle). The output signals V1, V2 and V3 of the magnetic sensors 21, 22 and 23 may be termed the first output signal V1, the second output signal V2 and the third output signal V3, respectively.

If the amplitudes A1, A2 and A3 of the output signals V1, V2 and V3 of the three magnetic sensors 21, 22 and 23 are equal to a value A or the signals V1, V2 and V3 are normalized such that the amplitudes become a predetermined prescribed value A, the first, second and third output signals V1, V2 and V3 are expressed by $V1=A \cdot \sin \theta e$, $V2=A \cdot \sin(\theta e+120°$ and $V3=A \cdot \sin(\theta e+240°)$, respectively. Furthermore, when A=1, the first, second and third output signals V1, V2 and V3 are expressed by $V1=\sin \theta e$, $V2=\sin(\theta e+120°)$ and $V3=\sin(\theta e+240°)$, respectively. Then, for the sake of easy description, the output signals V1, V2 and V3 of the magnetic sensors 21, 22 and 23 are expressed by $V1=\sin \theta e$, $V2=\sin(\theta e+120°)$ and $V3=\sin(\theta e+240°=\cos \theta e$, respectively.

Referring back to FIG. 1, the output signals V1, V2 and V3 of the magnetic sensors 21, 22 and 23 are input to a rotation angle computing device 20. The rotation angle computing device 20 computes the electric angle $\theta e$ of the rotor 1 on the basis of the output signals V1, V2 and V3 of the magnetic sensors 21, 22 and 23. In addition, the rotation angle computing device 20 computes the relative mechanical angle $\theta m$ of the rotor 1 on the basis of the obtained electric angle $\theta e$, and the like. The rotation angle computing device 20 is formed of, for example, a microcomputer, and includes a central processing unit (CPU) and memories (a ROM, a RAM, a rewritable nonvolatile memory, and the like).

The electric angle $\theta e$ and relative mechanical angle $\theta m$ computed by the rotation angle computing device 20 are given to a motor controller 30. The motor controller 30 uses the electric angle $\theta e$ and relative mechanical angle $\theta m$ received from the rotation angle computing device 20 to control the brushless motor 10. In order to compute the relative mechanical angle θm, it is necessary to detect a magnetic pole transition in at least one of the output signals V1, V2 and V3 (a transition in magnetic pole sensed by at least one of the magnetic sensors 21, 22 and 23). The rotation angle computing device 20 has the following function. That is, when a magnetic pole transition in the output signal of a selected magnetic sensor is detected, even if a stuck abnormality occurs in one of the output signals of the two magnetic sensors other than the selected magnetic sensor, the rotation angle computing device 20 is able to accurately detect a transition in magnetic pole sensed by the selected magnetic sensor. In addition, the rotation angle computing device 20 has the function of being able to accurately compute the relative mechanical angle θm even if a stuck abnormality occurs in one of the output signals of the magnetic sensors 21, 22 and 23.

Figure 4:
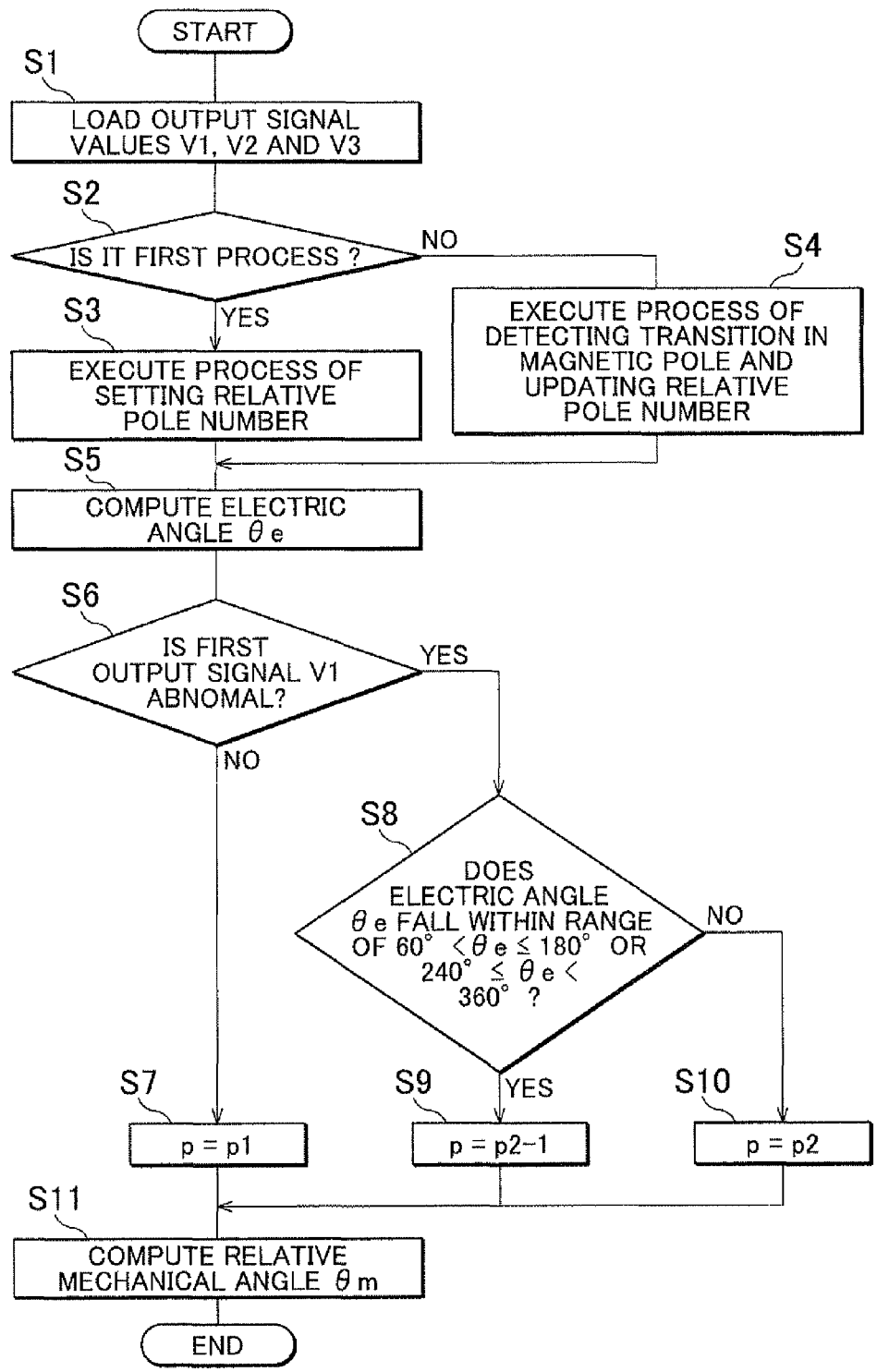
FIG. 4 is a flowchart that shows the procedure of rotation angle computing process executed by a rotation angle computing device.

FIG. 4 is a flowchart that shows the procedure of rotation angle computing process executed by the rotation angle computing device 20. The rotation angle computing process shown in FIG. 4 is repeatedly executed at predetermined computation intervals. A relative number, allocated to each magnetic pole using the magnetic pole sensed by the first magnetic sensor 21 at the time of the start of rotation angle computing process as a reference magnetic pole, is defined as a relative pole number. The relative pole number sensed by the first magnetic sensor 21 (hereinafter, referred to as "first relative pole number") is denoted by a variable p1, and the relative pole number sensed by the second magnetic sensor 22 (hereinafter, referred to as "second relative pole number") is denoted by a variable p2. In this embodiment, when the magnetic pole sensed by the first magnetic sensor 21 at the time of the start of rotation angle computing process (reference magnetic pole) is a north pole, the relative pole number "0" is allocated to that magnetic pole. On the other hand, when the magnetic pole sensed by the first magnetic sensor 21 at the time of the start of rotation angle computing process (reference magnetic pole) is a south pole, the relative pole number "1" is allocated to that magnetic pole.

When the rotation angle computing process is started, the rotation angle computing device 20 reads the values of the output signals V1, V2 and V3 of the respective magnetic sensors 21, 22 and 23 (step S1). Note that the memory (for example, RAM) of the rotation angle computing device 20 stores the output signal values that have been read so far since the computation cycle that is multiple cycles before the present computation cycle.

When the output signal values V1, V2 and V3 are read in step S1, the rotation angle computing device 20 determines whether the current process is the first process after the start of rotation angle computing process (step S2). When the current process is the first process after the start of rotation angle computing process (YES in step S2), the rotation angle computing device 20 executes the process of setting a relative pole number (step S3).

Figure 5:
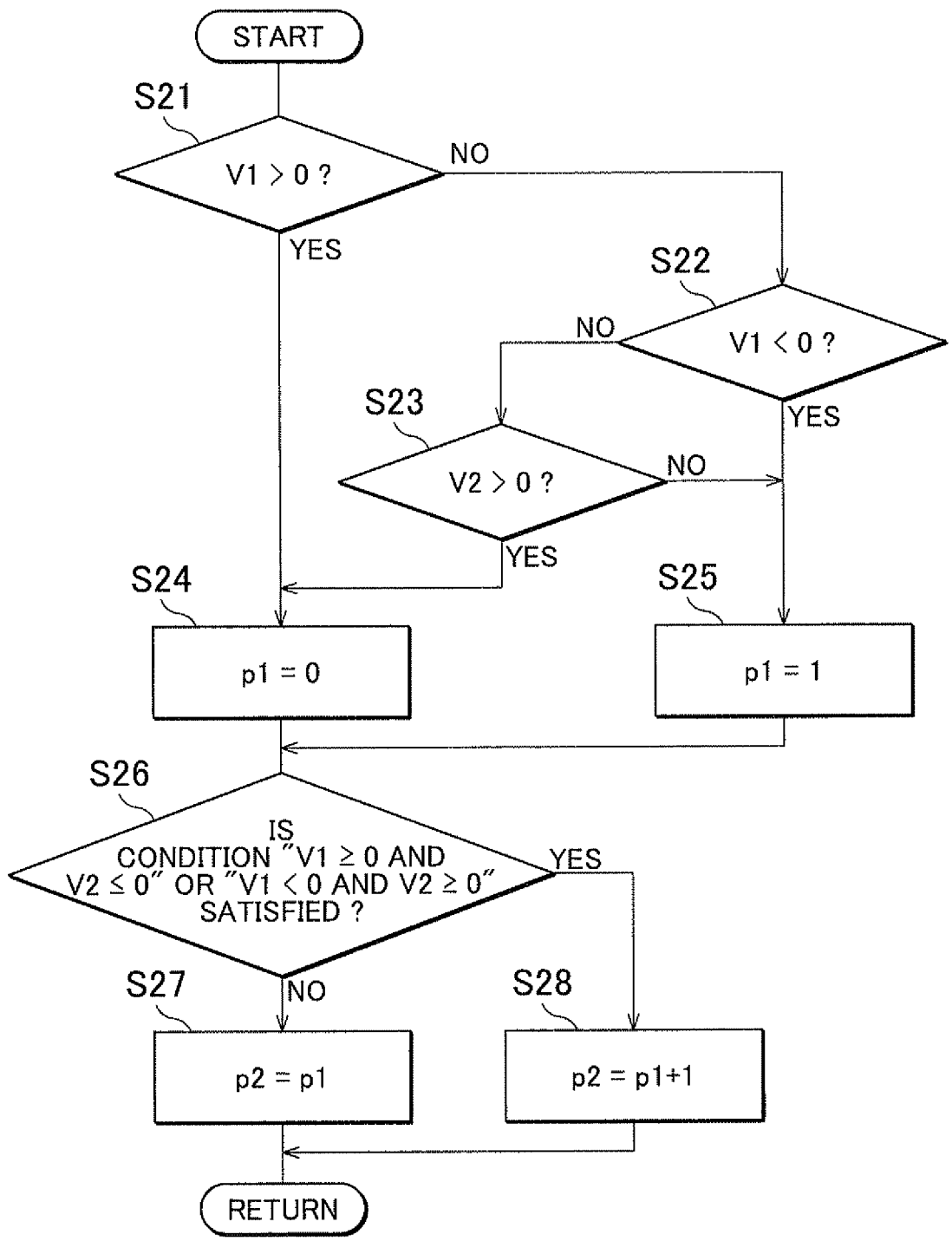
FIG. 5 is a flowchart that shows the procedure of the process of setting a relative pole number in step S3 of FIG. 4.

FIG. 5 shows the detailed procedure of the process of setting a relative pole number.

The rotation angle computing device 20 initially determines whether the value of the first output signal V1 is larger than 0 (step S21). When the value of the first output signal V1 is larger than 0 (YES in step S21), the rotation angle computing device 20 determines that the magnetic pole sensed by the first magnetic sensor 21 (reference magnetic pole) is a north pole, and then sets the first relative pole number p1 at 0 (step S24). Then, the process proceeds to step S26.

On the other hand, when value of the first output signal V1 is smaller than or equal to 0 (NO in step S21), the rotation angle computing device 20 determines whether the value of the first output signal V1 is smaller than 0 (step S22). When the value of the first output signal V1 is smaller than 0 (YES in step S22), the rotation angle computing device 20 determines that the magnetic pole sensed by the first magnetic sensor 21 (reference magnetic pole) is a south pole, and then sets the first relative pole number p1 at 1 (step S25). Then, the process proceeds to step S26.

When it is determined in step S22 that the value of the first output signal V1 is larger than or equal to 0 (NO in step S22), that is, when the value of the first output signal V1 is 0, the rotation angle computing device 20 determines whether the value of the second output signal V2 is larger than 0 in order to determine whether the rotor rotation angle (electric angle) is 0° or 180° (step S23). When the value of the second output signal V2 is larger than 0 (YES in step S23), the rotation angle computing device 20 determines that the rotor rotation angle (electric angle) is 0°, and then sets the first relative pole number p1 at 0 (step S24). Then, the process proceeds to step S26.

On the other hand, when the value of the second output signal V2 is smaller than or equal to 0 (NO in step S23), the rotation angle computing device 20 determines that the rotor rotation angle (electric angle) is 180°, and then sets the first relative pole number p1 at 1 (step S25). Then, the process proceeds to step S26. Note that the rotation angle computing device 20 may determine in step S23 whether the value of the third output signal V3 is smaller than 0. In this case, when the value of the third output signal V3 is smaller than 0, the rotation angle computing device 20 proceeds to step S24 and then sets the first relative pole number p1 at 0. On the other hand, when the value of the third output signal V3 is larger than or equal to 0, the rotation angle computing device 20 proceeds to step S25 and then sets the first relative pole number p1 at 1.

In step S26, the rotation angle computing device 20 determines whether the condition "V1≥0 and V2≤0" or the condition "V1<0 and V2≥0" is satisfied. When the above condition is satisfied (YES in step S26), the rotation angle computing device 20 determines that the magnetic pole sensed by the first magnetic sensor 21 is different from the magnetic pole sensed by the second magnetic sensor 22, and then sets the second relative pole number p2 at a number that is larger by 1 than the first relative pole number p1 (step S28). Then, the process returns to step S5 in FIG. 4.

On the other hand, when the condition of step S26 is not satisfied (NO in step S24), the rotation angle computing device 20 determines that the magnetic pole sensed by the first magnetic sensor 21 is the same as the magnetic pole sensed by the second magnetic sensor 22, and then sets the second relative pole number p2 at a number equal to the first relative pole number p1 (step S27). Then, the process returns to step S5 in FIG. 4.

The reason why it is determined that the magnetic pole sensed by the first magnetic sensor 21 is different from the magnetic pole sensed by the second magnetic sensor 22 when the condition of step S26 is satisfied and it is determined that the magnetic pole sensed by the first magnetic sensor 21 is the same as the magnetic pole sensed by the second magnetic sensor 22 when the condition of step S26 is not satisfied will be described below.

Figure 6A:
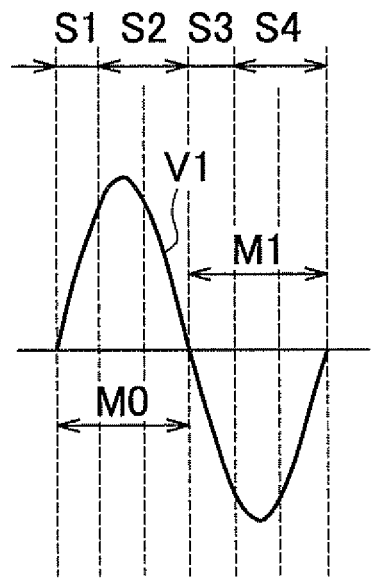
FIG. 6A to FIG. 6C are schematic views for illustrating the process of setting a relative pole number.
Figure 6B:
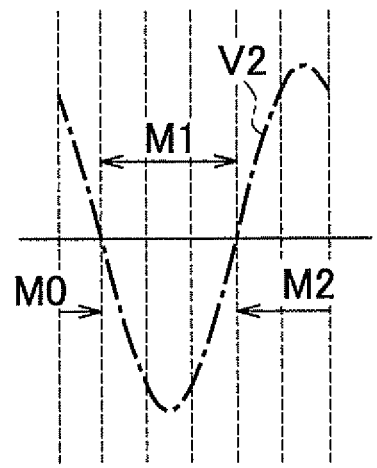
Figure 6C:
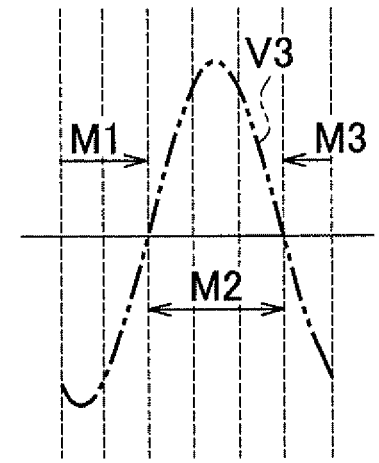
Figure 8:
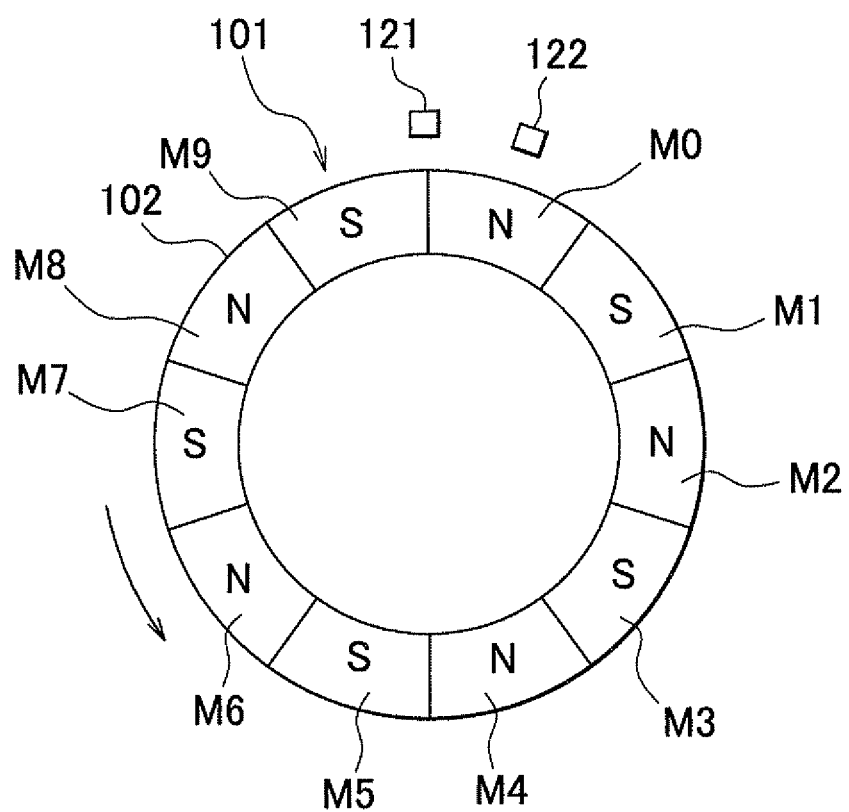
FIG. 8 is a schematic view for illustrating a rotation angle detecting method executed by an existing rotation angle detecting device.
Figure 9:
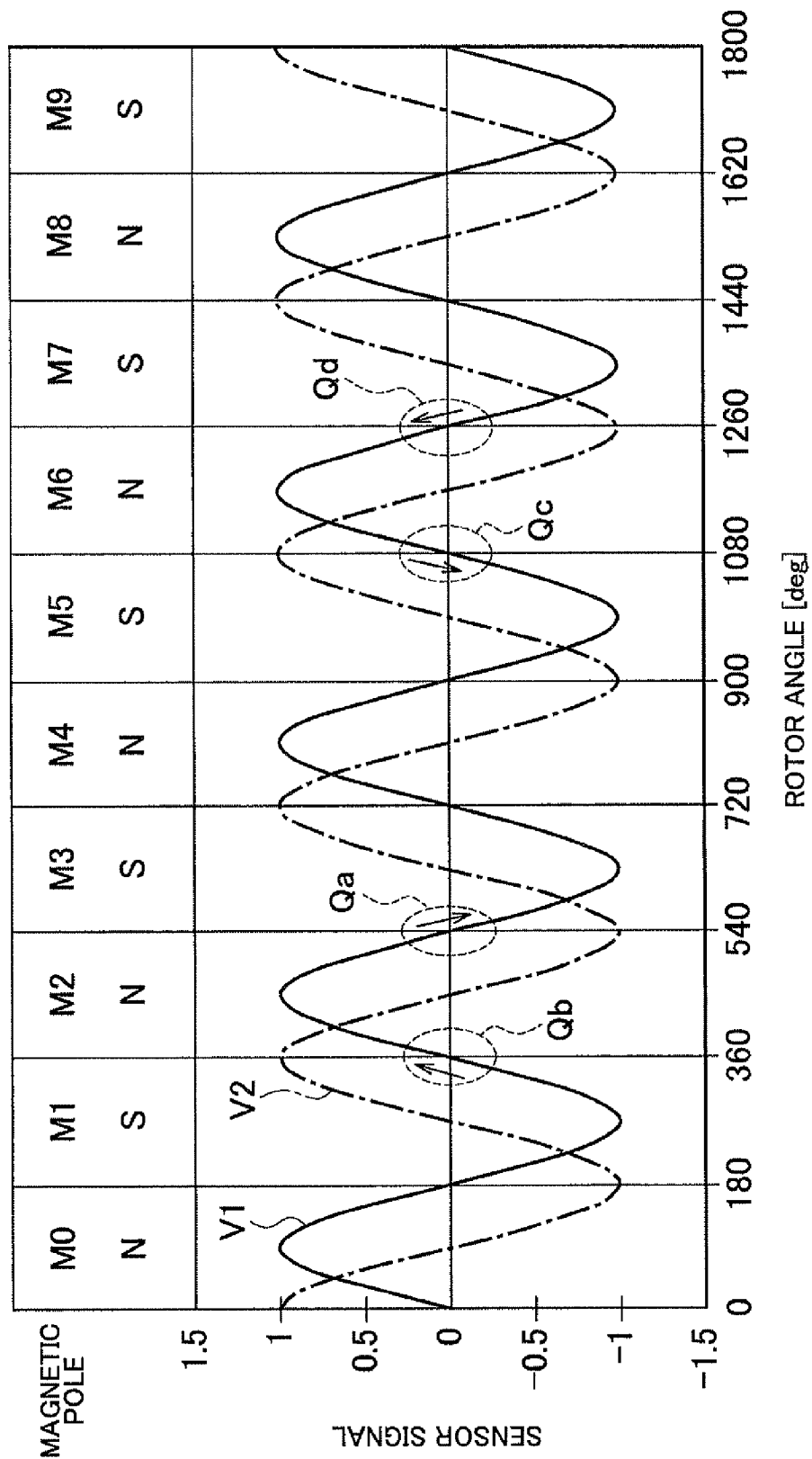
FIG. 9 is a schematic view that shows the output signal waveform of a first magnetic sensor and the output signal waveform of a second magnetic sensor.
Figure 10:
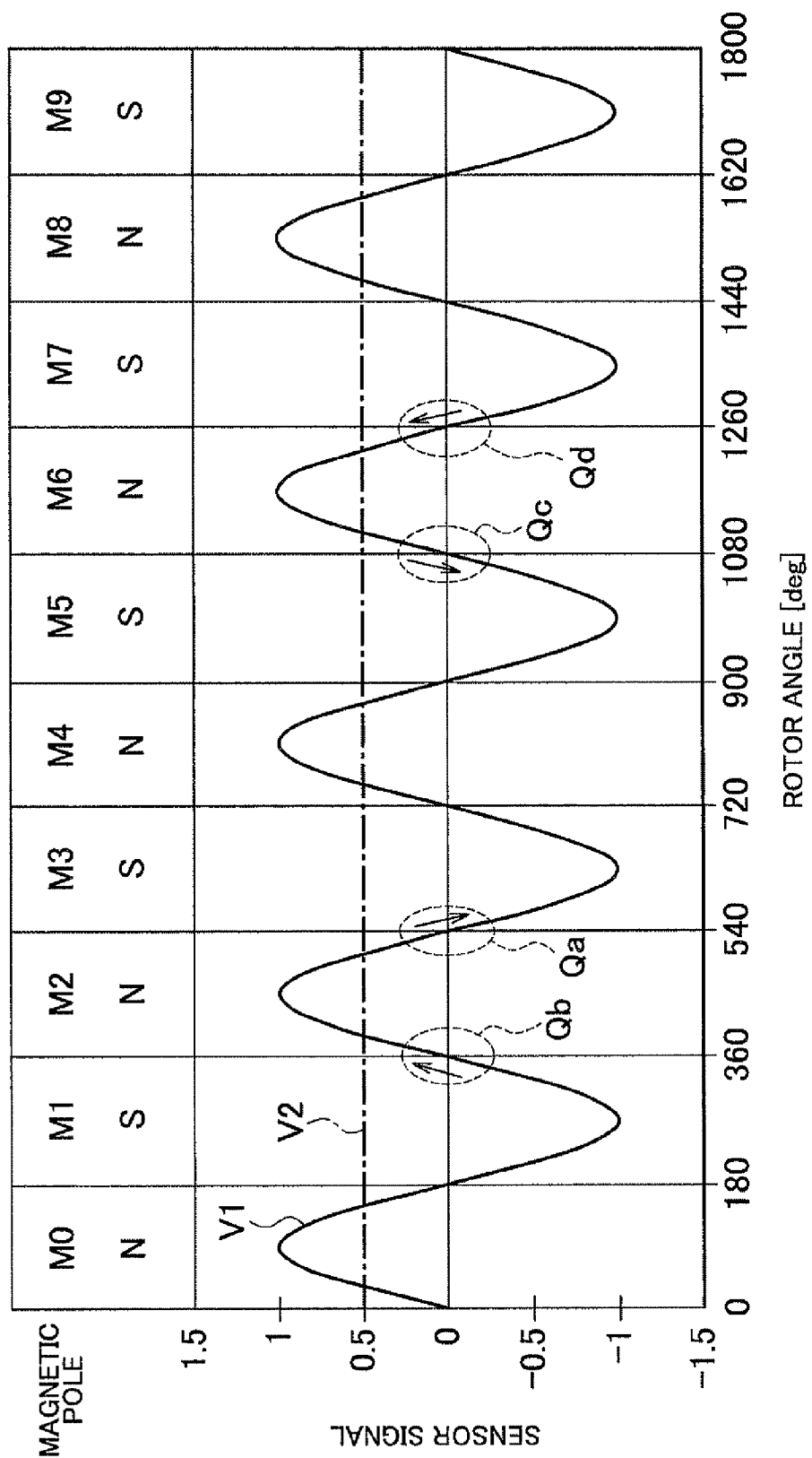
FIG. 10 is a schematic view for illustrating the fact that a transition in magnetic pole is erroneously detected in the case where a stuck abnormality has occurred in one of the output signals of the two magnetic sensors.

For example, FIG. 6A to FIG. 6C schematically show the signal waveforms of the output signals V1, V2 and V3 of the first, second and third magnetic sensors 21, 22 and 23 at the time when the magnetic pole pair formed of the magnetic pole M0 and the magnetic pole M1 of the rotor 1 passes the first magnetic sensor 21. In FIG. 6A and FIG. 6B, S1 indicates the region in which the first magnetic sensor 21 and the second magnetic sensor 22 both sense the magnetic pole M0. S2 indicates the region in which the first magnetic sensor 21 senses the magnetic pole M0 and the second magnetic sensor 22 senses the magnetic pole M1. S3 indicates the region in which the first magnetic sensor 21 and the second magnetic sensor 22 both sense the magnetic pole M1. S4 indicates the region in which the first magnetic sensor 21 senses the magnetic pole M1 and the second magnetic sensor 22 senses the magnetic pole M2.

That is, in the regions S1 and S3, the pole number of the magnetic pole sensed by the second magnetic sensor 22 is equal to the pole number of the magnetic pole sensed by the first magnetic sensor 21. On the other hand, in the regions S2 and S4, the pole number of the magnetic pole sensed by the second magnetic sensor 22 is larger by 1 than the pole number of the magnetic pole sensed by the first magnetic sensor 21. In the region S1, both output signal values V1 and V2 satisfy the first condition that V1≥0 and V2>0. In the region S2, both output signal values V1 and V2 satisfy the second condition that V1≥0 and V2≤0. In the region S3, both output signal values V1 and V2 satisfy the third condition that V1≥0 and V2≤0. In the region S4, both output signal values V1 and V2 satisfy the fourth condition that V1<0 and V2≥0.

Then, the rotation angle computing device 20 determines that the magnetic pole sensed by the first magnetic sensor 21 is different from the magnetic pole sensed by the second magnetic sensor 22 when the second condition (V1≥0 and V2≤0) or the fourth condition (V1<0 and V2≥0) is satisfied, and determines that the magnetic pole sensed by the first magnetic sensor 21 is the same as the magnetic pole sensed by the second magnetic sensor 22 when neither the second condition nor the fourth condition is satisfied.

Referring back to FIG. 4, when it is determined in step S2 that the current process is not the first process after the start of rotation angle computing process (NO in step S2), the process proceeds to step S4. In step S4, the rotation angle computing device 20 executes the process of detecting a transition in magnetic pole and updating a relative pole number. In this embodiment, the rotation angle computing device 20 executes the process of detecting a transition in magnetic pole sensed by the first magnetic sensor 21 and a transition in magnetic pole sensed by the second magnetic sensor 22. Then, when the rotation angle computing device 20 has detected a transition in magnetic pole sensed by the first magnetic sensor 21, the rotation angle computing device 20 updates the first relative pole number p1. In addition, when the rotation angle computing device 20 has detected a transition in magnetic pole sensed by the second magnetic sensor 22, the rotation angle computing device 20 updates the second relative pole number p2.

The process of detecting a transition in magnetic pole sensed by the first magnetic sensor 21 and the process of updating the first relative pole number p1 will be described with reference to FIG. 3. A transition in magnetic pole sensed by the first magnetic sensor 21 is classified into the following four cases.

a) The magnetic pole sensed by the first magnetic sensor 21 changes from the north pole to the south pole when the rotor 1 is rotating in the normal direction. For example, as indicated by the arrow in the ellipse indicated by the reference sign Qa in FIG. 3, the magnetic pole sensed by the first magnetic sensor 21 changes from M2 to M3.

b) The magnetic pole sensed by the first magnetic sensor 21 changes from the south pole to the north pole when the rotor 1 is rotating in the normal direction. For example, as indicated by the arrow in the ellipse indicated by the reference sign Qb in FIG. 3, the magnetic pole sensed by the first magnetic sensor 21 changes from M1 to M2.

c) The magnetic pole sensed by the first magnetic sensor 21 changes from the north pole to the south pole when the rotor 1 is rotating in the reverse direction. For example, as indicated by the arrow in the ellipse indicated by the reference sign Qc in FIG. 3, the magnetic pole sensed by the first magnetic sensor 21 changes from M6 to M5.

d) The magnetic pole sensed by the first magnetic sensor 21 changes from the south pole to the north pole when the rotor 1 is rotating in the reverse direction. For example, as indicated by the arrow in the ellipse indicated by the reference sign Qd in FIG. 3, the magnetic pole sensed by the first magnetic sensor 21 changes from M7 to M6.

The rotation angle computing device 20 determines whether a transition in magnetic pole of any one of the above descriptions a) to d) has occurred. When the rotation angle computing device 20 determines that a transition in magnetic pole has occurred, the rotation angle computing device 20 updates the first relative pole number p1. The rotation angle computing device 20 determines whether the following first determination condition is satisfied in order to determine whether there is a transition in magnetic pole in the above description a) (see Qa in FIG. 3). Note that, ΔV2 denotes the absolute value of the difference between the immediately preceding value and current value of the second output signal V2, and ΔV3 denotes the absolute value of the difference between the immediately preceding value and current value of the third output signal V3.

First Determination Condition: "V2<0 in the case where ΔV2≥ΔV3, and V3>0 in the case where ΔV2≤ΔV3" and "the immediately preceding value of V1>0" and "the current value of V1≤0".

When the rotation angle computing device 20 determines that the first determination condition is satisfied, the rotation angle computing device 20 updates the first relative pole number p1 to a value larger by 1.

In addition, the rotation angle computing device 20 determines whether the following second determination condition is satisfied in order to determine whether there is a transition in magnetic pole in the above description b) (see Qb of FIG. 3).

Second Determination Condition: "V2>0 in the case where ΔV2≥ΔV3, and V3<0 in the case where ΔV2<ΔV3" and "the immediately preceding value of V1<0" and "the current value of V1≥0".

When the rotation angle computing device 20 determines that the second determination condition is satisfied, the rotation angle computing device 20 updates the first relative pole number p1 to a value larger by 1. Note that, when the first relative pole number p1 is "9", a value larger by 1 than "9" is "0".

In addition, the rotation angle computing device 20 determines whether the following third determination condition is satisfied in order to determine whether there is a transition in magnetic pole in the above description c) (see Qc of FIG. 3). Third Determination Condition: "V2>0 in the case where ΔV2≥ΔV3, and V3<0 in the case where ΔV2<ΔV3" and "the immediately preceding value of V1≥0" and "the current value of V1<0".

When the rotation angle computing device 20 determines that the third determination condition is satisfied, the rotation angle computing device 20 updates the first relative pole number p1 to a value smaller by 1. Note that, when the first relative pole number p1 is "0", a value smaller by 1 than "0" is "9".

In addition, the rotation angle computing device 20 determines whether the following fourth determination condition is satisfied in order to determine whether there is a transition in magnetic pole in the above description d) (see Qd of FIG. 3). Fourth Determination Condition: "V2<0 in the case where $\Delta V2 \geq \Delta V3$, and V3>0 in the case where $\Delta V2 < \Delta V3$" and "the immediately preceding value of V1≤0" and "the current value of V1>0".

When the rotation angle computing device 20 determines that the fourth determination condition is satisfied, the rotation angle computing device 20 updates the first relative pole number p1 to a value smaller by 1.

In addition, the rotation angle computing device 20 determines whether the following four determination conditions (fifth determination condition to eighth determination condition) are satisfied in order to determine whether a transition in magnetic pole sensed by the second magnetic sensor 22 has occurred. Note that, $\Delta V1$ denotes the absolute value of the difference between the immediately preceding value and current value of the first output signal V1.

Fifth Determination Condition (transition from a north pole to a south pole in the case of the normal rotation direction): "V1>0 in the case where $\Delta V1 \leq \Delta V3$, and V3<0 in the case where $\Delta V1 < \Delta V3$" and "the immediately preceding value of V2>0" and "the current value of V2≤0".

Sixth Determination Condition (transition from a south pole to a north pole in the case of the normal rotation direction): "V1<0 in the case where $\Delta V1 \geq \Delta V3$, and V3>0 in the case where $\Delta V1 < \Delta V3$" and "the immediately preceding value of V2<0" and "the current value of V2≥0".

Seventh Determination Condition (transition from a north pole to a south pole in the case of the reverse rotation direction): "V1<0 in the case where $\Delta V1 \geq \Delta V3$, and V3>0 in the case where $\Delta V1 < \Delta V3$" and "the immediately preceding value of V2≤0" and "the current value of V2<0".

Eighth Determination Condition (transition from a south pole to a north pole in the case of the reverse rotation direction): "V1>0 in the case where $\Delta V1 > \Delta V3$, and V3<0 in the case where $\Delta V1 < \Delta V3$" and "the immediately preceding value of V2≤0" and "the current value of V2>0".

When the fifth determination condition or the sixth determination condition is satisfied, the rotation angle computing device 20 updates the second relative pole number p2 to a value larger by 1. Note that, when the second relative pole number p2 is "9", a value larger by 1 than "9" is "0". On the other hand, when the seventh determination condition or the eighth determination condition is satisfied, the rotation angle computing device 20 updates the second relative pole number p2 to a value smaller by 1. Note that, when the second relative pole number p2 is "0", a value smaller by 1 than "0" is "9".

In this embodiment, it is not determined whether a transition in magnetic pole sensed by the third magnetic sensor 23 has occurred. However, it is possible to determine whether a transition in magnetic pole sensed by the third magnetic sensor 23 has occurred. Specifically, it is determined whether the following four determination conditions (ninth determination condition to twelfth determination condition) are satisfied to thereby make it possible to determine whether a transition in magnetic pole sensed by the third magnetic sensor 23 has occurred.

Ninth Determination Condition (transition from a north pole to a south pole in the case of the normal rotation direction): "V1<0 in the case where $\Delta V1 \geq \Delta V2$, and V2>0 in the case where $\Delta V1 < \Delta V2$" and "the immediately preceding value of V3>0" and "the current value of V3≤0".

Tenth Determination Condition (transition from a south pole to a north pole in the case of the normal rotation direction): "V1>0 in the case where $\Delta V1 \geq \Delta V2$, and V2<0 in the case where $\Delta V1 < \Delta V2$" and "the immediately preceding value of V3<0" and "the current value of V3≥0".

Eleventh Determination Condition (transition from a north pole to a south pole in the case of the reverse rotation direction): "V1>0 in the case where $\Delta V1 \geq \Delta V2$, and V2<0 in the case where $\Delta V1 < \Delta V2$" and "the immediately preceding value of V3≥0" and "the current value of V3<0".

Twelfth Determination Condition (transition from a south pole to a north pole in the case of the reverse rotation direction): "V1<0 in the case where $\Delta V1 \geq \Delta V2$, and V2>0 in the case where $\Delta V1 < \Delta V2$" and "the immediately preceding value of V3≤0" and "the current value of V3>0".

Because a transition in magnetic pole sensed by the selected magnetic sensor is detected using the above described determination conditions, even if a stuck abnormality occurs in one of the output signals of the two magnetic sensors other than the selected magnetic sensor, a transition in magnetic pole sensed by the selected magnetic sensor may be accurately detected. This will be examined by way of an example in which a transition in magnetic pole sensed by the first magnetic sensor 21 is detected. FIG. 7 shows the output signals in the case where the value of the second output signal V2 is fixed at 0.5 due to a stuck abnormality.

It is examined whether a transition in magnetic pole indicated by the arrow in the ellipse Qa of FIG. 7 (transition from a north pole to a south pole in the case of the normal rotation direction) is detected based on the first determination condition.

The first determination condition is that "V2<0 in the case where $\Delta V2$ $\Delta V3$, and V3>0 in the case where $\Delta V2 < \Delta V3$" and "the immediately preceding value of V1>0" and "the current value of V1≤0". The value of the second output signal V2 in which a stuck abnormality has occurred hardly changes, so $\Delta V2$ is a small value. Therefore, at the time point of a transition in magnetic pole indicated by the arrow in the ellipse Qa of FIG. 7, $\Delta V2 < \Delta V3$.

As a result, whether the requirement "V2<0 in the case where $\Delta V2$ $\Delta V3$, and V3>0 in the case where $\Delta V2 < \Delta V3$" in the first determination condition is satisfied is determined using not the second output signal V2 in which a stuck abnormality has occurred but the third output signal V3. At the time point of a transition in magnetic pole indicated by the arrow in the ellipse Qa of FIG. 7, V3>0. Therefore, the first determination condition is satisfied. That is, even when a stuck abnormality has occurred in the second output signal V2, it is possible to accurately detect a transition from a north pole to a south pole in the case of the normal rotation direction on the basis of the first determination condition.

It is examined whether a transition in magnetic pole indicated by the arrow in the ellipse Qb of FIG. 7 (transition from a south pole to a north pole in the case of the normal rotation direction) is detected based on the second determination condition. The second determination condition is that "V2>0 in the case where $\Delta V2 \leq \Delta V3$, and V3<0 in the case where $\Delta V2 < \Delta V3$" and "the immediately preceding value of V1<0" and "the current value of V1≥0". Because $\Delta V2$ is a small value, at the time point of a transition in magnetic pole indicated by the arrow in the ellipse Qb of FIG. 7, $\Delta V2 < \Delta V3$.

As a result, whether the requirement "V2>0 in the case where $\Delta V2 \geq \Delta V3$, and V3<0 in the case where $\Delta V2 < \Delta V3$" in the second determination condition is satisfied is determined using not the second output signal V2 in which a stuck abnormality has occurred but the third output signal V3. At the time point of a transition in magnetic pole indicated by the arrow in the ellipse Qb of FIG. 7, V3<0. Therefore, the second determination condition is satisfied. That is, even when a stuck abnormality has occurred in the second output signal V2, it is possible to accurately detect a transition from a south pole to a north pole in the case of the normal rotation direction on the basis of the second determination condition.

It is examined whether a transition in magnetic pole indicated by the arrow in the ellipse Qc of FIG. 7 (transition from a north pole to a south pole in the case of the reverse rotation direction) is detected based on the third determination condition. The third determination condition is that "V2>0 in the case where ΔV2≥ΔV3, and V3<0 in the case where ΔV2<ΔV3" and "the immediately preceding value of V1≥0" and "the current value of V1<0". Because ΔV2 is a small value, at the time point of a transition in magnetic pole indicated by the arrow in the ellipse Qc of FIG. 7, ΔV2<ΔV3.

As a result, whether the requirement "V2>0 in the case where ΔV2 ΔV3, and V3<0 in the case where ΔV2<ΔV3" in the third determination condition is satisfied is determined using not the second output signal V2 in which a stuck abnormality has occurred but the third output signal V3. At the time point of a transition in magnetic pole indicated by the arrow in the ellipse Qc of FIG. 7, V3<0. Therefore, the third determination condition is satisfied. That is, even when a stuck abnormality has occurred in the second output signal V2, it is possible to accurately detect a transition from a north pole to a south pole in the case of the reverse rotation direction on the basis of the third determination condition.

It is examined whether a transition in magnetic pole indicated by the arrow in the ellipse Qd of FIG. 7 (transition from a south pole to a north pole in the case of the reverse rotation direction) is detected based on the fourth determination condition. The fourth determination condition is that "V2<0 in the case where ΔV2≥ΔV3, and V3>0 in the case where ΔV2<ΔV3" and "the immediately preceding value of V1≤0" and "the current value of V1>0". Because ΔV2 is a small value, at the time point of a transition in magnetic pole indicated by the arrow in the ellipse Qd of FIG. 7, ΔV2<ΔV3.

As a result, whether the requirement "V2<0 in the case where ΔV2 ΔV3, and V3>0 in the case where ΔV2<ΔV3" in the fourth determination condition is satisfied is determined using not the second output signal V2 in which a stuck abnormality has occurred but the third output signal V3. At the time point of a transition in magnetic pole indicated by the arrow in the ellipse Qd of FIG. 7, V3>0. Therefore, the fourth determination condition is satisfied. That is, even when a stuck abnormality has occurred in the second output signal V2, it is possible to accurately detect a transition from a south pole to a north pole in the case of the reverse rotation direction on the basis of the fourth determination condition.

When a stuck abnormality has occurred in the third output signal V3 instead of the second output signal V2, at the time point of a transition in magnetic pole sensed by the first magnetic sensor 21, ΔV2>ΔV3. Therefore, the sign of the second output signal V2 is determined. That is, the third output signal V3 in which a stuck abnormality has occurred is not used in determination regarding a transition in magnetic pole. Thus, even when a stuck abnormality has occurred in the third output signal V3, the first to fourth determination conditions are used to make it possible to accurately detect a transition in magnetic pole sensed by the first magnetic sensor 21.

Note that, also in the case of determination regarding a magnetic pole transition in the output signal V2 of the second magnetic sensor 22, even when a stuck abnormality has occurred in one of the output signals V1 and V3 of the magnetic sensors 21 and 23, it is possible to accurately detect a magnetic pole transition in the output signal V2 of the second magnetic sensor 22. In addition, also in the case of determination regarding a magnetic pole transition in the output signal V3 of the third magnetic sensor 23, even when a stuck abnormality has occurred in one of the output signals V1 and V2 of the other magnetic sensors 21 and 22, it is possible to accurately detect a magnetic pole transition in the output signal V3 of the third magnetic sensor 23.

When the process of step S4 ends, the process proceeds to step S5. In step S5, the rotation angle computing device 20 computes the electric angle θe on the basis of the output signal values V1, V2 and V3 read in step S1. Note that, at this time, the rotation angle computing device 20 determines whether a stuck abnormality has occurred in one of the output signals V1, V2 and V3. Determination as to whether a stuck abnormality has occurred in any one of the output signals V1, V2 and V3 is, for example, made by checking whether the output signal value hardly changes over a predetermined number of times for each of the output signals V1, V2 and V3. That is, when the output signal value hardly changes over a predetermined number of times, the rotation angle computing device 20 determines that a stuck abnormality has occurred in the output signal corresponding to that output signal value.

The rotation angle computing device 20 computes the first electric angle θe1 corresponding to the rotation angle of the rotor 1 on the basis of the first output signal V1 and the second output signal V2. In addition, the rotation angle computing device 20 computes the second electric angle θe2 corresponding to the rotation angle of the rotor 1 on the basis of the first output signal V1 and the third output signal V3. In addition, the rotation angle computing device 20 computes the third electric angle θe3 corresponding to the rotation angle of the rotor 1 on the basis of the second output signal V2 and the third output signal V3. A method of computing the first, second and third electric angles θe1, θe2 and θe3 will be described later.

Then, when the rotation angle computing device 20 determines that all the output signals V1, V2 and V3 are normal, the final electric angle θe is, for example, computed according to Expression 2. That is, the rotation angle computing device 20 computes the mean value of the first, second and third electric angles θe1, θe2 and θe3 as the final electric angle θe.

$$\theta e = (\theta e1 + \theta e2 + \theta e3)/3 \qquad \text{Expression 2}$$

Note that, when it is determined that all the output signals V1, V2 and V3 are normal, the rotation angle computing device 20 is able to compute the median value of the first, second and third electric angles θe1, θe2 and θe3 as the final electric angle θe. In addition, in this case, the rotation angle computing device 20 may determine, as the final rotation angle θ, the average of the median of the first rotation angle $\theta_1$, the second rotation angle $\theta_2$, and the third rotation angle $\theta_3$, and another one of the rotation angles $\theta_1$, $\theta_2$, and $\theta_3$ which is closer to the median. Furthermore, in this case, the rotation angle computing device 20 may determine one of the first, second and third electric angles θe1, θe2 and θe3 as the final electric angle θe.

In addition, when the rotation angle computing device 20 determines that the first output signal V1 is abnormal and the second and third output signals V2 and V3 are normal, the rotation angle computing device 20 determines the third electric angle θe3 computed on the basis of the second and third output signals V2 and V3 as the final electric angle θe.

In addition, when the rotation angle computing device 20 determines that the second output signal V2 is abnormal and the first and third output signals V1 and V3 are normal, the rotation angle computing device 20 determines the second electric angle θe2 computed on the basis of the first and third output signals V1 and V3 as the final electric angle θe.

In addition, when the rotation angle computing device 20 determines that the third output signal V3 is abnormal and the first and second output signals V1 and V2 are normal, the rotation angle computing device 20 determines the first electric angle θe1 computed on the basis of the first and second output signals V1 and V2 as the final electric angle θe.

Note that, when the rotation angle computing device 20 determines that two or more of the three output signals V1, V2 and V3 are abnormal, the rotation angle computing device 20 is not able to compute the electric angle θe. Therefore, the rotation angle computing device 20 outputs a motor stop command to the motor controller 30, and stops the rotation angle computing process.

A method of computing the first electric angle θe1 will be described. The rotation angle computing device 20 initially computes a signal $V_{12}$ (=sin(θe+90°)=cos θe), of which the phase difference from the first output signal V1 is 90°, based on the first output signal V1 (=sin θe) and the second output signal V2 (=sin(θe+120°)). More specifically, the rotation angle computing device 20 computes the signal $V_{12}$ according to Expression 3.

$$V_{12} = \cos\theta e \qquad (3)$$
$$= \frac{\sin(\theta e + 120°) - \sin\theta e \cdot \cos 120°}{\sin 120°}$$
$$= \frac{V2 - V1 \cdot \cos 120°}{\sin 120°}$$
$$= \frac{2 \cdot V2 + V1}{\sqrt{3}}$$

Expression 3 may be derived through an expression obtained by developing sin(θe+120°) using a trigonometric addition formula. Then, the rotation angle computing device 20 uses the signal $V_{12}$ (=cos θe) and the first output signal V1 (=sin θe) to compute the first electric angle θe1 according to Expression 4.

$$\theta e1 = \tan^{-1}\frac{\sin\theta e}{\cos\theta e} \qquad (4)$$
$$= \tan^{-1}\frac{V1}{V_{12}}$$

A method of computing the second electric angle θe2 will be described. The rotation angle computing device 20 initially generates a signal $V_{13}$ (=sin(θe+90°)=cos θe), of which the phase difference from the first output signal V1 is 90°, based on the first output signal V1 (=sin θe) and the third output signal V3 (=sin(θe+240°)). More specifically, the rotation angle computing device 20 generates the signal $V_{13}$ according to Expression 5.

$$V_{13} = \cos\theta e \qquad (5)$$
$$= \frac{\sin(\theta e + 240°) - \sin\theta e \cdot \cos 240°}{\sin 240°}$$
$$= \frac{V3 - V1 \cdot \cos 240°}{\sin 240°}$$
$$= \frac{-2 \cdot V3 - V1}{\sqrt{3}}$$

Expression 5, as well as Expression 3, may be derived through an expression obtained by developing sin(θe+240°) using a trigonometric addition formula. Then, the rotation angle computing device 20 uses the signal $V_{13}$ (=cos θe) and the first output signal V1 (=sin θe) to compute the second electric angle θe2 according to Expression 6.

$$\theta e2 = \tan^{-1}\frac{\sin\theta e}{\cos\theta e} \qquad (6)$$
$$= \tan^{-1}\frac{V1}{V_{13}}$$

A method of computing the third electric angle θe3 will be described. The rotation angle computing device 20 initially computes the electric angle θe3' (=θe+120°), which is advanced by 120° with respect to the rotation angle (electric angle) θe of the rotor 1, on the basis of the second output signal V2 and the third output signal V3. Then, the third electric angle θe3 is computed by subtracting 120° from the obtained rotation angle θe3'.

The rotation angle computing device 20 generates a signal $V_{23}$ (=sin(θe+120°+90°)), of which the phase difference from the second output signal V2 is 90°, based on the second output signal V2 (=sin(θe+120°)) and the third output signal V3 (=sin(θe+240°)).

Where θe'=θe+120°, the output signal V2 is expressed by the sinusoidal signal sin θe' and the output signal V3 is expressed by the sinusoidal signal sin(θ'+120°) of which the phase difference is advanced by 120° from the sinusoidal signal sin θe', the signal $V_{23}$ (=sin(θe'+90°)=cos θe') of which the phase difference from the sinusoidal signal sin θe' is 90° may be obtained as in the case of the method of computing the first electric angle θe1.

Specifically, the rotation angle computing device 20 generates the signal $V_{23}$ according to Expression 7.

$$V_{23} = \cos\theta e' \qquad (7)$$
$$= \frac{\sin(\theta e' + 120°) - \sin\theta e' \cdot \cos 120°}{\sin 120°}$$
$$= \frac{\sin(\theta e + 240°) - \sin(\theta + 120°) \cdot \cos 120°}{\sin 120°}$$
$$= \frac{V3 - V2 \cdot \cos 120°}{\sin 120°}$$
$$= \frac{2 \cdot V3 + V2}{\sqrt{3}}$$

Subsequently, the rotation angle computing device 20 uses the signal $V_{23}$ (=cos θe') and the second output signal V2 (=sin θe'=sin(θe+120°)) to compute the rotation angle θe3' according to Expression 8.

$$\theta e3' = \tan^{-1}\frac{\sin\theta e'}{\cos\theta e'} \qquad (8)$$
$$= \tan^{-1}\frac{V2}{V_{23}}$$

Then, the rotation angle computing device 20 computes the third electric angle θe3 according to Expression 9.

$$\theta e3 = \theta e3' - 120° \qquad \text{Expression 9}$$

When the electric angle θe is computed in step S5, the rotation angle computing device 20 determines whether the first output signal V1 is determined to be abnormal (stuck abnormality) (step S6). When the first output signal V1 is not determined to be abnormal (NO in step S6), the rotation angle computing device 20 sets the value of the first relative pole number p1 as the mechanical angle computing pole number p used to compute the relative mechanical angle θm (step S7). The mechanical angle computing pole number p indicates the relative pole number of the magnetic pole sensed by the first magnetic sensor 21. When the first output signal V1 is normal, it may be understood that the first relative pole number p1 properly indicates the relative pole number of the magnetic pole sensed by the first magnetic sensor 1. Therefore, the value of the first relative pole number p is set as the mechanical angle computing pole number p. Then, the process proceeds to step S11.

On the other hand, when the first output signal V1 is determined to be abnormal (YES in step S6), the first relative pole number p1 is unreliable. Therefore, the rotation angle computing device 20 computes the mechanical angle computing pole number p on the basis of the second relative pole number p2. Specifically, the rotation angle computing device 20 determines whether the magnetic pole sensed by the first magnetic sensor 21 is the same as or different from the magnetic pole sensed by the second magnetic sensor 22 (step S8). More specifically, it is determined whether the electric angle θe computed in step S5 falls within the range of 60°<θe≤180° or 240°≤θe<360°. In FIG. 6A and FIG. 6B, in the region S1 and the region S3, the magnetic pole sensed by the first magnetic sensor 21 is the same as the magnetic pole sensed by the second magnetic sensor 22. On the other hand, in the region S2 and the region 54, the magnetic pole sensed by the first magnetic sensor 21 is different from the magnetic pole sensed by the second magnetic sensor 22.

In the region S2, the electric angle θe falls within the range of 60°<θe≤180°. In the region S4, the electric angle θe falls within the range of 240°≤θe<360°. Thus, when the electric angle θe falls within the range of 60°<θe≤180° or the range of 240°≤θe<360° (YES in step S8), the rotation angle computing device 20 determines that the magnetic pole sensed by the first magnetic sensor 21 is different from the magnetic pole sensed by the second magnetic sensor 22. Then, in this case, the rotation angle computing device 20 sets a value smaller by 1 than the second relative pole number p2 as the mechanical angle computing pole number p (step S9). Then, the process proceeds to step S11.

On the other hand, when it is determined in step S8 that the electric angle θe falls outside both the range of 60°<θe≤180° and the range of 240°≤θe<360° (NO in step S8), the rotation angle computing device 20 determines that the magnetic pole sensed by the first magnetic sensor 21 is the same as the magnetic pole sensed by the second magnetic sensor 22. Thus, in this case, the rotation angle computing device 20 sets the value of the second relative pole number p2 as the mechanical angle computing pole number p (step S10). Then, the process proceeds to step S11.

In step S11, the rotation angle computing device 20 uses the electric angle θe computed in step S5 and the mechanical angle computing pole number p to compute the relative mechanical angle θm according to Expression 10. Then, the electric angle θe computed in step S5 and the relative mechanical angle θm computed in step S11 are given to the motor controller 30.

$$\theta m = \theta e + n \times 360°$$ Expression 10

Note that, n=0 when p=0 or 1, n=1 when p=2 or 3, n=2 when p=4 or 5, n=3 when p=6 or 7, and n=4 when p=8 or 9.

When the process of step S11 ends, the process in the current computation cycle ends.

According to the embodiment, the rotation angle computing device 20 is able to compute the electric angle θe and the relative mechanical angle θm in each predetermined computation cycle and to give the computed electric angle θe and relative mechanical angle θm to the motor controller 30. Even when a stuck abnormality has occurred in one of the output signals V1, V2 and V3 of the three magnetic sensors 21, 22 and 23, the rotation angle computing device 20 is able to accurately compute the electric angle θe. In addition, even when a stuck abnormality has occurred in one of the output signals V1, V2 and V3 of the three magnetic sensors 21, 22 and 23, the rotation angle computing device 20 is able to accurately detect a transition in magnetic pole sensed by at least one of the three magnetic sensors 21, 22 and 23. Thus, it is possible to accurately compute the relative mechanical angle θm.

The first to third embodiments of the invention are described above; however, the invention may be implemented in other embodiments. For example, in the above described embodiments, the phase difference among the output signals V1, V2 and V3 of the magnetic sensors 21, 22 and 23 is 120° in electric angle. However, as long as the phase difference is set such that, around the zero-crossing of each output signal, the rates of changes in the other two output signals are relatively large, the phase difference may be an angle other than 120°. Specifically, the phase difference among the output signals V1, V2 and V3 may be an angle that falls within the range of 20° to 35° in electric angle, the range of 55° to 70° in electric angle, the range of 110° to 125° in electric angle or the range of 145° to 160° in electric angle.

In addition, in the above embodiments, the rotor 1 has five magnetic pole pair. Alternatively, the number of magnetic pole pairs may be smaller than five or larger than five.

In addition, in the above embodiments, the relative pole number p1 of the magnetic pole sensed by the first magnetic sensor 21 and the relative pole number p2 of the magnetic pole sensed by the second magnetic sensor 22 are set and updated. Alternatively, the relative pole number p1 of the magnetic pole sensed by the first magnetic sensor 21 and the relative pole number p3 of the magnetic pole sensed by the third magnetic sensor 23 may be set and updated. Furthermore, the relative pole number p1 of the magnetic pole sensed by the first magnetic sensor 21, the relative pole number p2 of the magnetic pole sensed by the second magnetic sensor 22 and the relative pole number p3 of the magnetic pole sensed by the third magnetic sensor 23 may be set and updated.

In addition, at the instance when the sensor signal, which is subjected to determination regarding a transition in magnetic pole, fails, for example, when the sensor signal fails and the value of the signal is stuck to +1 while the value of the sensor signal is smaller than 0, the absolute value of the difference between the immediately preceding value and current value of that sensor signal is extremely large. When determination regarding a transition in magnetic pole is made using the immediately preceding value and the current value the difference between which is extremely large in absolute value are used without considering the above abnormal condition, erroneous determination may possibly be made. Then, the absolute value of the difference between an immediately preceding value and current value of a sensor signal, which is subjected to determination regarding a transition in magnetic pole, is compared with a predetermined threshold. When the absolute value of the difference is larger than the predetermined threshold, it is determined that an abnormality has occurred in that signal and then the signal is not used in determination regarding a transition in magnetic pole.

In addition, the invention may be applied to a case where the rotation angle of a rotor, other than the rotor of the brushless motor, is detected. Other than the above, various design changes may be applied within the range of the matter recited in the appended claims.

What is claimed is:

1. A rotation angle detecting device that includes a detection rotor that rotates in accordance with rotation of a rotor and that has a plurality of magnetic poles, and a sensor that outputs three sinusoidal signals which have a phase difference of a predetermined degree in accordance with rotation of the detection rotor, the rotation angle detecting device detecting a rotation angle of the rotor based on the sinusoidal signals, comprising:

a signal reading unit that reads the sinusoidal signals in each predetermined computation cycle; and a detecting unit that detects a magnetic pole transition in at least one of the sinusoidal signals on the basis of the sinusoidal signals read by the signal reading unit, wherein when the sinusoidal signal in which a magnetic pole transition is detected is a first sinusoidal signal, one of the other two sinusoidal signals is a second sinusoidal signal and the other one of the other two sinusoidal signals is a third sinusoidal signal, the detecting unit detects a magnetic pole transition in the first sinusoidal signal based on a current value of one of the second sinusoidal signal and the third sinusoidal signal, an absolute value of a difference between an immediately preceding value and the current value of the one of the second and third sinusoidal signals being larger than an absolute value of a difference between an immediately preceding value and the current value of the other of the second and third sinusoidal signals, an immediately preceding value of the first sinusoidal signal and a current value of the first sinusoidal signal.

2. The rotation angle detecting device according to claim 1, wherein the predetermined degree by which phases of the three sinusoidal signals are different from each other is 120° in electric angle.

* * * * *